June 29, 1937.  H. A. GREENWALD  2,085,355

MOTOR AND COMPRESSOR ASSEMBLY

Filed Sept. 2, 1930  2 Sheets-Sheet 1

INVENTOR
Harold A. Greenwald

ATTORNEYS

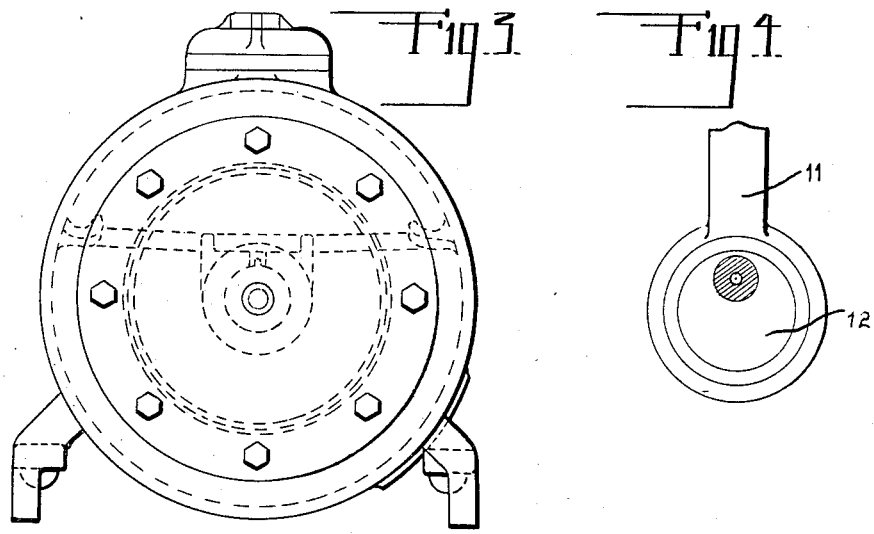
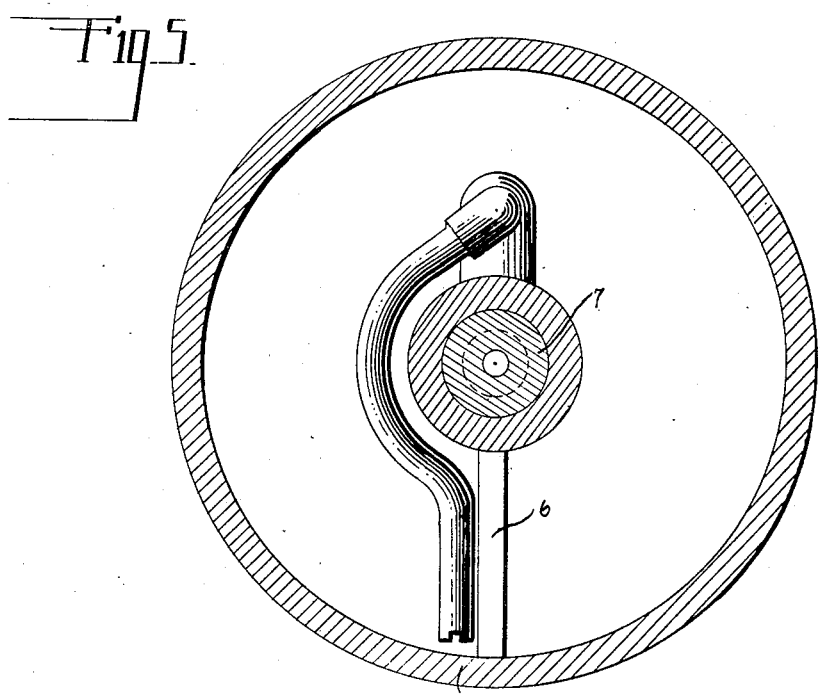

Patented June 29, 1937

2,085,355

UNITED STATES PATENT OFFICE 2,085,355

MOTOR AND COMPRESSOR ASSEMBLY

Harold A. Greenwald, Detroit, Mich., assignor, by mesne assignments, to Kelvinator Corporation, Detroit, Mich., a corporation of Michigan Application September 2, 1930, Serial No. 479,394

2 Claims. (Cl. 230—58)

This invention relates generally to refrigerating apparatus and refers more particularly to motor and compressor assemblies.

One of the essential objects of the invention is to provide an assembly in which a compressor and a motor are located at and connected to opposite ends of a single shaft within a common casing or housing.

Another object is to provide a unitary compressor motor assembly of simplified construction in which the machining and assembling of the parts are greatly facilitated.

Another object is to provide an assembly that is compact, simple in construction, and economical to manufacture.

Other objects, advantages, and novel details of construction of this invention will be made more apparent as this description proceeds, especially when considered in connection with the accompanying drawings, wherein:

Fig. 3 is another end view of the construction illustrated in Fig. 1;

Fig. 4 is a sectional view taken on the line 4—4 of Fig. 1; and

Fig. 5 is a sectional view taken on the line 5—5 of Fig. 1.

Figure 1:
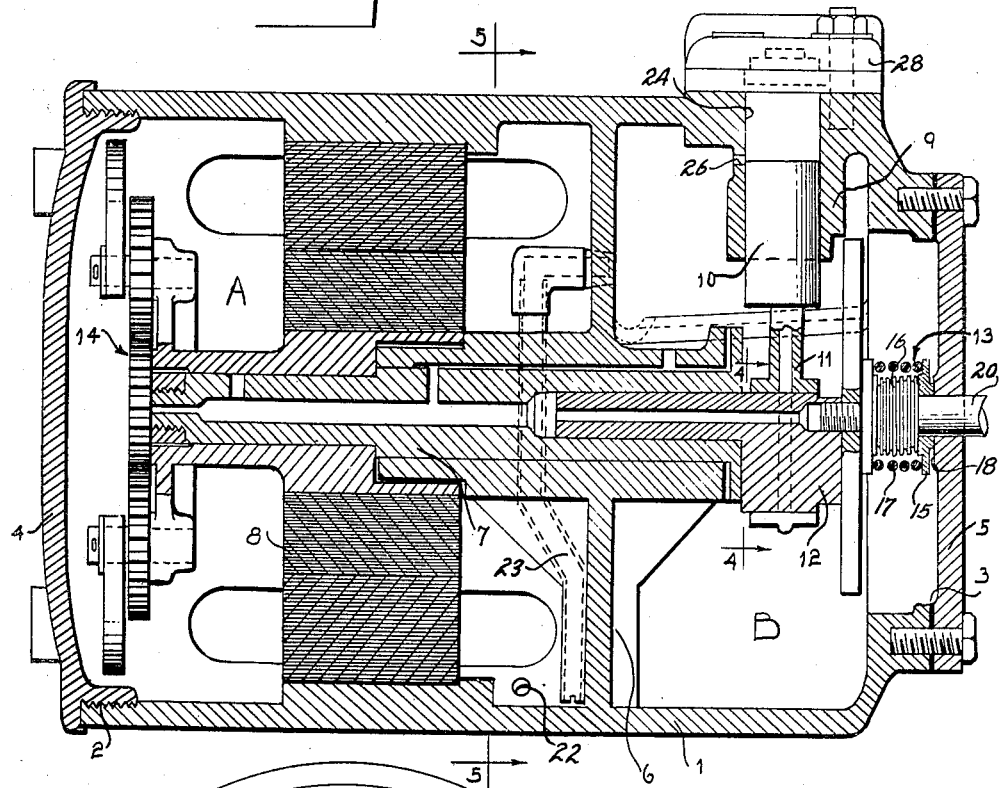
Fig. 1 is a vertical sectional view through an assembly embodying my invention.
Figure 2:
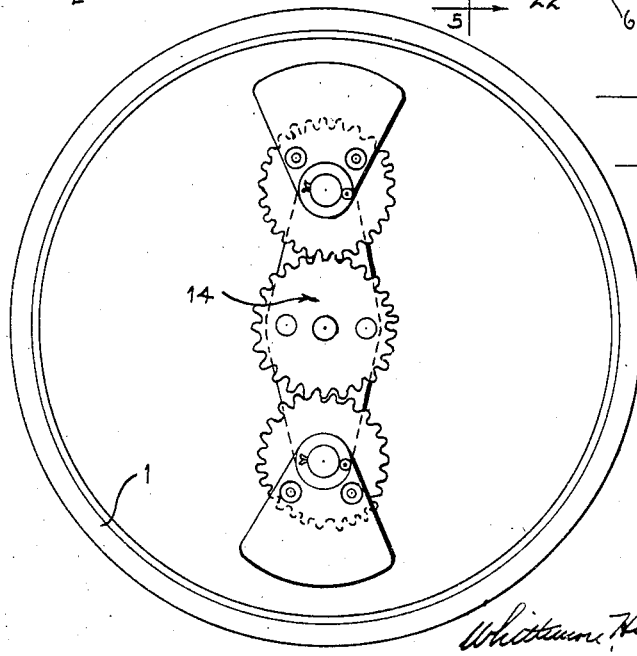
Fig. 2 is an end view of the construction illustrated in Fig. 1.

Referring now to the drawings, the compressor unit comprises a casing 1 of substantially tubular formation having openings 2 and 3, respectively, at opposite ends thereof. Closure plates 4 and 5 are provided for said openings and a partition 6 extends transversely of the casing intermediate its ends and divides the same into two compartments A and B, respectively. A shaft 7 is journaled in the partition 6 and closure 5 and operatively interconnects an electric motor in the compartment A and a refrigerant compressor 9 in the compartment B having a piston 10 connected by a rod 11 to an eccentric portion 12 of the shaft 3. A seal 13 is provided on the shaft 7 for preventing the escape of refrigerant and/or lubricant along the shaft through the closure 5; and a power transmitting device 14 on the shaft 7 is connected to the motor 8 to transmit power from the latter to the shaft. The seal construction and power transmitting device constitute the subject matter of other applications in my name, hence need not be described in detail in this application. It is desired to point out at this time, however, that the sealed member includes a seal ring 15, a bellows 16 and a spring 17, which spring always tends to urge said seal ring toward a sealing surface 18 provided on said closure 5.

In use, when the motor 8 is started the device 14 will transmit power to the shaft 7 which in turn will operate the rod 11 and piston 10 of the compressor. The rotation of shaft 7 also causes rotation of seal 13 and the shaft portion 20, which is screw threaded into eccentric 12 and extends through an opening in closure plate 5. The extended portion 20 serves to operate a fan (not shown) or the like. Thus, a single shaft with a motor at one end and a compressor at the other is utilized to obtain the desired results. The partition 6 between the motor and compressor not only serves as a bearing for this shaft but also keeps oil in the compressor chamber B from flooding the motor in the chamber A. As a result, the assembly is extremely compact, simple in construction and economical to manufacture. It will also be apparent that the compressor and motor are substantially sealed in the casing 1. Thus, no dirt or dust can get into the motor. Gaseous refrigerant is admitted to the casing and through an inlet 22, whence it passes through conduit 23 into a refrigerant compartment B. The gaseous refrigerant in compartment B enters a compression chamber 24 through an inlet passage 26. Compressed refrigerant is discharged from the casing and through an opening (not shown) in the compressor discharge head 28.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. In a unitary refrigerant compressor motor assembly the combination of a compressor, a driving motor therefor, a casing enclosing the motor and compressor so that both the motor and the compressor are exposed to the refrigerant medium passing through said casing to aid in cooling the motor, end closure plates on said casing, a drive shaft connecting the motor and compressor, a shaft extension operatively connected thereto and extending through one of said end closure plates, sealing means including an expansible diaphragm associated with said shaft and wall to prevent leakage of refrigerant from the casing about the extended portion of said shaft and a spring tending to move the shaft in one direction and the sealing means in the opposite direction toward said wall.

2. In a unitary refrigerant compressor motor assembly the combination of a compressor, a driving motor therefor, a casing enclosing the motor and compressor so that both the motor and compressor are exposed to the refrigerant medium passing through said casing, end closure plates on said casing, a bearing, a drive shaft connecting the motor and compressor and journalled in said bearing, a shaft extension operatively connected thereto and having a portion extending through one of said end closure plates, and sealing means comprising a biased sealing member on said shaft for urging said shaft toward said bearing and said sealing means toward a sealing surface on said end closure plate which cooperates with the rotatable sealing member on the shaft to prevent leakage of refrigerant from the casing about the extended portion of said shaft.

HAROLD A. GREENWALD.